United States Patent
Vion et al.

(10) Patent No.: US 9,751,780 B2
(45) Date of Patent: Sep. 5, 2017

(54) COAGULATION/FLOCCULATION APPARATUS FOR THE TREATMENT OF A HYDRAULIC FLOW, AND IMPLEMENTATION PROCESS

(71) Applicant: DEGREMONT, Paris la Defense (FR)

(72) Inventors: Patrick Vion, Houilles (FR); Guillem Grau, Courbevoie (FR)

(73) Assignee: DEGREMONT (FR)

( * ) Notice: Subject to any disclaimer, the term of this patent is extended or adjusted under 35 U.S.C. 154(b) by 400 days.

(21) Appl. No.: 14/370,520

(22) PCT Filed: Jan. 3, 2013

(86) PCT No.: PCT/IB2013/050053
§ 371 (c)(1),
(2) Date: Oct. 15, 2014

(87) PCT Pub. No.: WO2013/102864
PCT Pub. Date: Jul. 11, 2013

(65) Prior Publication Data
US 2015/0076075 A1    Mar. 19, 2015

(30) Foreign Application Priority Data
Jan. 4, 2012   (FR) ..................................... 12 50071

(51) Int. Cl.
 C02F 1/52   (2006.01)
 C02F 1/24   (2006.01)
 C02F 1/44   (2006.01)
(52) U.S. Cl.
 CPC .................. *C02F 1/52* (2013.01); *C02F 1/24* (2013.01); *C02F 1/444* (2013.01); *C02F 1/5209* (2013.01); *C02F 1/5281* (2013.01)

(58) Field of Classification Search
None
See application file for complete search history.

(56) References Cited

U.S. PATENT DOCUMENTS 5,382,369 A * 1/1995 Vion ...................... B01D 17/00
                                                        210/702
6,277,285 B1 * 8/2001 Vion .................. B01D 21/0042
                                                        210/709

(Continued)

FOREIGN PATENT DOCUMENTS

FR   2835247    8/2003
WO   03076343   9/2003

OTHER PUBLICATIONS

Translation of the Written Opinion of the International Search Report PCT/IB2013/050053.

*Primary Examiner* — Chester Barry
(74) *Attorney, Agent, or Firm* — The Belles Group, P.C.

(57) ABSTRACT

Coagulation/flocculation apparatus for the treatment of a hydraulic flow of any type of liquid, upstream of a physical separation element, in particular upstream of a flotation unit, or of a filtration unit, in particular a membrane filtration unit, which apparatus comprises at least one coagulator with injection of coagulant, followed by a flocculator, which are successively passed through by the hydraulic flow, in which apparatus: the coagulator comprises a reactor (1) for injection of coagulant under high energy, followed by a low-energy coagulation reactor (2); an intermediate high-energy element (3) is placed between the coagulation reactor (2) and the flocculator (4); and the flocculator is a static flocculator of piston type (4) having the same width as the physical separation element (5) located downstream.

17 Claims, 3 Drawing Sheets

(56) References Cited

U.S. PATENT DOCUMENTS

| | | |
|---|---|---|
| 7,169,301 B2 | 1/2007 | Vion |
| 7,175,768 B2 * | 2/2007 | Vion ..................... B01D 21/04 210/202 |
| 2005/0150840 A1 * | 7/2005 | Vion ..................... B01D 21/04 210/703 |
| 2009/0211974 A1 * | 8/2009 | Bonnelye ........... B01D 21/0012 210/636 |
| 2010/0038314 A1 * | 2/2010 | Vion ....................... C02F 9/00 210/638 |
| 2015/0076075 A1 * | 3/2015 | Vion ....................... C02F 1/24 210/703 |

\* cited by examiner

COAGULATION/FLOCCULATION APPARATUS FOR THE TREATMENT OF A HYDRAULIC FLOW, AND IMPLEMENTATION PROCESS

PRIORITY

Priority is claimed as a national stage application, under 35 U.S.C. §371, to international application No. PCT/IB2013/050053, filed Jan. 3, 2013, which claims priority to French application FR1250071, filed Jan. 4, 2012. The disclosures of the aforementioned priority applications are incorporated herein by reference in their entirety.

The invention relates to an apparatus that makes it possible to carry out a coagulation/flocculation that precedes a phase of physical separation by flotation or by filtration or through membranes with a view to water clarification (removal of particles or colloids in suspension).

The invention is more especially adapted to clarification via flotation which does not require flocs (aggregates of particles) to be produced that are as dense and as large as those required by settling.

The field of application is that of the clarification of surface waters, subterranean waters, seawaters, waste waters and industrial waters, rainwaters and generally all types of water or liquid suspensions suitable for flotation, or even for filtration or separation through membranes which require the same type of flocks as flotation.

Apparatuses of this type are known, in particular from French patent FR 2835247 or patent EP 1 483 210 B1 filed in the name of the company DEGREMONT.

In order to clarify water, it is necessary to form a flock or agglomerate of neutralized colloids or particles. This flock will then be able to be separated from the liquid phase either by settling by virtue of its settling velocity, or by flotation, following the binding thereto of microbubbles, by virtue of its upflow velocity. For a person skilled in the art, flotation is reserved for lightly polluted waters generally having pollution loadings of less than 30 NTU or 30 g/m$^3$ of suspended matter.

In order to form a flock, it is necessary to carry out a coagulation and then a flocculation. Coagulation consists of an addition of reactant, the coagulant (in general trivalent cations), in particular iron or aluminum salts, enabling the destabilization of the colloidal particles present in the water and the neutralization of all the electronegative charges on these particles. During this step, the neutralized particles begin to agglomerate in order to form microflocks. These microflocks are too small to settle and even too small to hook microbubbles.

Flocculation, which follows coagulation, is a step intended to enlarge the flocks. During this step, a flocculation aid (polymer, generally synthetic polymer) is often injected in order to make the flocks larger and denser. This injection of polymer is quasi-systematic for settling tanks and, under a few particular conditions, for flotation units.

In order to be physically separated from the water by settling, a flock must be dense and preferably of large size. Conversely, in order to be separated by flotation, it is sufficient for said flock to be well formed: it must be light and may be of small or large size.

The coagulation/flocculation phases are carried out for almost all cases in reactors of the same type for settling and flotation.

For settling, use is generally made of:
  a coagulator having a residence time of around 1 minute with a high energy per unit volume (50 to 200 W/m$^3$),
  a 1- or 2-stage (sometimes 3-stage) flocculator, these stages being stirred by impellers with a high axial component and at relatively slow speed for overall residence times of between 15 and 30 minutes. Some more sophisticated flocculators are stirred by impellers that are jacketed and/or equipped with a recirculation of natural ballast (sludge) or added ballast (ballast or sand). In the last case, the residence times may be shorter: 6 to 12 minutes. In order to obtain flocks having a high settling velocity that make it possible to reduce the cross section of the settling zone, polymer is injected at the top of the flocculator.

Flocculation referred to as static flocculation, that is to say without a stirring member (tank with deflectors or baffles) has been used in the past ahead of very slow velocity settling tanks before the appearance of synthetic polymers.

The actual settling tank may be static or equipped with a plate in order to reduce the settling cross section. The settled sludges are discharged via the bottom with or without the use of a scraper or a hopper when the clarified water is discharged at the surface.

For the flotation, in most cases the same coagulators/flocculators are found:
  a coagulator having a residence time generally of less than or equal to 1 minute with a high energy per unit volume (50 to 200 W/m$^3$)
  a 1- or 2-stage flocculator, these stages being stirred by impellers with a high axial component and at relatively slow speed, or even very slow speed for overall residence times between 15 and 30 minutes. Some more sophisticated flocculators comprise, as in the case of settling tanks, jacketed impellers. In the last case, the residence times are sometimes reduced and become: 15 to 20 minutes. The injection of polymer is not necessary in flotation except in cases of highly loaded or very cold waters.
  An actual flotation unit at the head of which the flocculated water is mixed with an emulsion of microbubbles of gas, generally of air, which attach to the flocks and make them rise to the surface where they are collected and discharged whilst the clarified water is discharged through the bottom of the flotation apparatus.

It is therefore seen that the coagulation/flocculation phases are carried out in almost all cases in reactors of the same type and practically of the same volume irrespective of the separation, settling or flotation technology. However, the quality desired for the flocks is not the same.

The objective of the invention is above all to propose a coagulation/flocculation apparatus suitable for a type of physical separation other than settling, in particular separation by flotation or by filtration or through membranes, which makes it possible to reduce the overall coagulation/flocculation residence time, to improve the performances and to increase in particular the field of application of separation by flotation.

According to the invention, a coagulation/flocculation apparatus for the treatment of a hydraulic flow of any type of liquid, upstream of a physical separation element, in particular upstream of a flotation unit, or of a filtration unit, in particular a membrane filtration unit, which apparatus comprises at least one coagulator with injection of coagulant, followed by a flocculator, which are successively passed through by the hydraulic flow, is characterized in that:
  the coagulator comprises a reactor for injection of coagulation under high energy, followed by a low-energy coagulation reactor, a high-energy intermediate element is positioned between the coagulation reactor and the flocculator, and the flocculator is a static flocculator of plug-flow type.

The static flocculator of plug-flow type may be the same width as the physical separation element located downstream.

Advantageously, the static flocculator of plug-flow type is a baffle flocculator.

The high-energy coagulant injection reactor may be separated from the coagulation reactor. The coagulant injection reactor may be at an energy between 40 and 10 000 W/m³. The coagulant injection reactor may be an in-line mixer with an energy per unit volume of between 200 and 10 000 W/m³. As a variant, the coagulant injection reactor may consist of at least one stirred tank reactor having an energy per unit volume of between 40 and 250 W/m³, or preferably two stirred tank reactors in series, having an energy per unit volume of between 40 and 250 W/m³.

Preferably, the coagulation reactor has an energy per unit volume of less than 10 W/m³.

Advantageously, the high-energy intermediate element induces an energy per unit volume of greater than 20 W/m³ in the upper zone of the plug-flow flocculator, in particular an energy between 20 and 100 W/m³. The high-energy intermediate element may consist of a weir having a fall head of at least 5 cm. Generally, the weir has a fall head of less than or equal to 25 cm.

In practice, the plug-flow flocculator is at an energy per unit volume of less than 1 W/m³, preferably less than 0.3 W/m³.

The invention also relates to a process for implementing a coagulation/flocculation apparatus as defined previously, for the treatment of a hydraulic flow of any type of liquid, characterized in that the residence time in the low-energy coagulation reactor is less than 1 minute. The residence time in the plug-flow type flocculation reactor is preferably between 2 and 8 minutes. The residence time in the coagulant injection reactor, in the case of a stirred tank reactor, is between 2 and 6 minutes, depending on the type of water to be treated.

Thus, in order to produce a coagulation/flocculation apparatus that is compact and performs well in flotation, the invention proposes to combine the following reactors or pieces of equipment:

a high-energy coagulant injection reactor,
a low-energy coagulation reactor (not stirred),
a high-energy component (weir) over the entire width of the flocculator,
a static flocculator of plug-flow type having the same width as the separator or the flotation unit from which the clarified water and the sludges originate.

The results obtained owing to this combination of components are surprising. The overall residence time of the flocculation (3 to 8 minutes), and the overall time of the coagulation/flocculation (4 to 12 minutes) are very significantly reduced with respect to the times of conventional coagulation/flocculation (16 to 31 minutes). Furthermore, the use of plug-flow flocculation compared to stirred (impeller) flocculation has surprisingly made it possible to treat polluted waters up to 200 or 300 NTU whereas conventionally the limit is around 30 NTU.

The invention consists, apart from the provisions as set out above, of a certain number of other provisions of which mention will be made more explicitly below with regard to examples described with reference to the appended drawings, but which are in no way limiting. In these drawings.

The coagulation/flocculation apparatus of the invention applies to any type of flotation unit, conventional or rapid. It is preferably compatible with flotation units of rectangular cross section.

Figure 1:
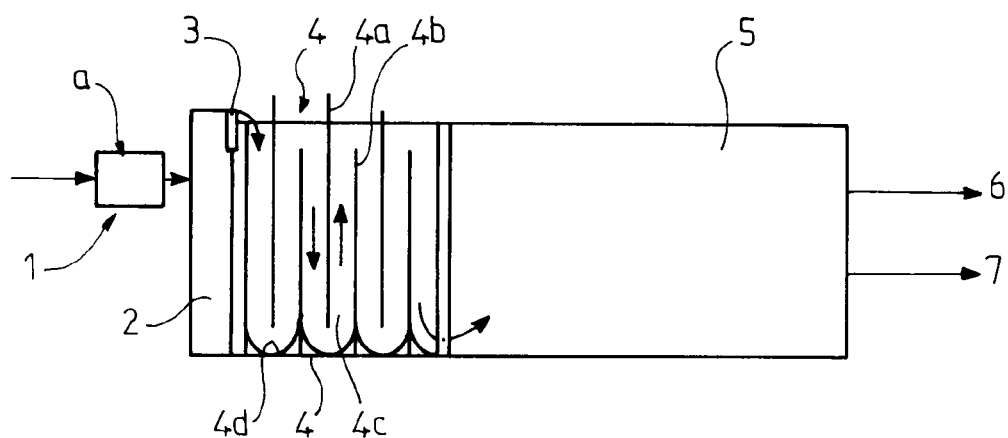
FIG. 1 is a vertical schematic cross section of a coagulation/flocculation apparatus according to the invention, followed by a flotation unit.
Figure 2:
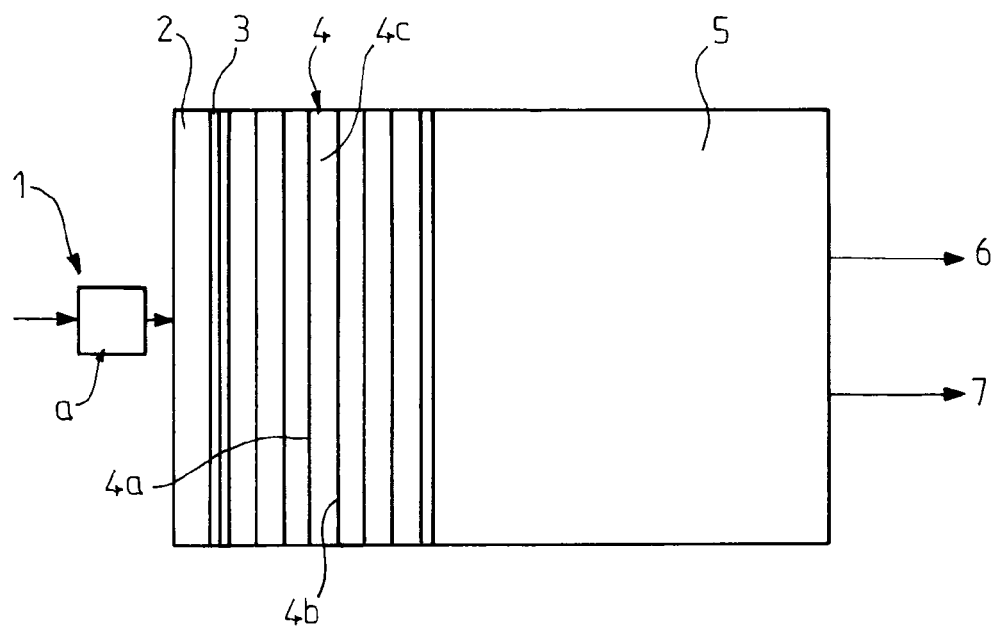
FIG. 2 is a schematic top view of the assembly from FIG. 1.

As illustrated in FIGS. 1 and 2, the raw water arrives, via a channel or a pipe, in a coagulant injection reactor 1. Depending on the applications, the coagulant a is injected either inline via a static mixer (not represented), or into the high-energy coagulant injection reactor 1, in any case greater than 40 W/m³. In the latter case, specific amongst others to surface waters and seawaters, the residence time in this reactor is at least equal to 2 minutes. This is a desired time for the invention (a condition for a floated water of quality), whereas the times generally observed in this phase are less than or around 1 minute.

Preferably, the coagulant injection reactor 1 is at an energy of greater than 40 W/m³, in particular between 40 W/m³ and 250 W/m³ for a stirred tank reactor and between 200 W/m³ and 10 000 W/m³ in the case of in-line mixers. On leaving this reactor, most of the colloids are neutralized and microflocks appear. The energy or power per unit volume corresponds to that dissipated by stirring means, such as impellers, installed in the reactor or in-line mixers.

The water undergoing coagulation arrives in a low-energy coagulation reactor 2, preferably having an energy of less than 10 W/m³, where the microflocks continue to appear and agglomerate. The objective is to have microflocks which begin to be visible to the naked eye. The residence time in this reactor 2 is less than 1 min. The coagulation reactor 2 is separate from the coagulant injection reactor 1, these reactors in particular being made in the form of separate basins or tanks. The coagulation reactor 2 constitutes a transfer zone between the coagulant injection reactor 1 and a plug-flow flocculator 4.

At the top of the reactor 2, a weir 3 with a fall of water having a head advantageously between 5 and 25 cm, is positioned over the entire width of the plug-flow flocculator 4. A high-energy zone, created by the weir 3, which follows the low-energy zone of the reactor 2, is surprising for a person skilled in the art who normally positions reactors with decreasing energies after the maximum energy coagulation reactor so as not to destroy the flocks already formed.

Unexpectedly, the weir 3 downstream of the low-energy reactor 2 allows hydraulic and process advances relative to the plug-flow flocculator that follows it. As a variant, a perforated tube could be installed instead of the weir 3.

The energy generated by the weir 3 (greater than 20 W/m³) will advantageously be used to ensure the mixing of the polymer should it prove necessary. If the flock is broken, it will be reformed under the action of the polymer. However, surprisingly, it has been possible to observe that even without polymer the weir 3 did not cause degradation but on the contrary it improved the quality of the treated water (see example 2 provided below). Two explanations are proposed. The first is that the microflocks are not yet large enough to be destroyed but are small enough to benefit from this energy which will increase their probability of meeting in this zone and therefore their chance of agglomerating and getting bigger. The second is revealed by measurement of dissolved oxygen. It has been possible to observe that this weir increased the amount of air dissolved in the water. Surface waters are often not saturated in oxygen, and therefore the microbubbles of air injected in order to make the flocks float are partly consumed by the unsaturated water. This fall of water just before the flotation therefore promotes the clarification by effective increase of the active microbubbles.

The weir 3 also makes it possible to distribute the hydraulic flow over the entire width of the plug-flow flocculator 4. A good distribution over the entire width of the flocculator is a condition favorable to plug flow in the flocculator.

In conclusion, the weir 3 makes it possible to distribute the hydraulic flow over the entire width of the plug-flow flocculator 4, to inject, if necessary, polymer without adding a specific reactor, to dissolve air thus leaving more active microbubbles and finally preceded by a low-energy reactor 2, the weir 3 promotes the formation of microflocks.

The coagulated water now feeds in the top part, under perfect conditions, the plug-flow flocculator 4.

It will be recalled that the object of flocculation, in view of a physical separation in particular by flotation, is to enlarge the flocks a minimum amount without however densifying them as is sought to do in settling. According to the invention, the plug-flow flocculator 4, which constitutes a low-energy reactor, is provided at an energy of less than 1 $W/m^3$, generally of less than 0.3 $W/m^3$, with a distribution that is as consistent as possible in order to avoid short circuits and enable all the incoming flocks to have the same residence time in order to thus have a uniform size on leaving the flocculator. It is in this way that installing the static flocculator 4 of plug-flow type makes it possible to obtain very good performances with very short residence times (3 to 8 minutes) depending on the applications and the temperatures of the effluent to be treated.

The static flocculator 4 of plug-flow type is preferably a baffle reactor consisting of alternate vertical plates 4a and 4b, which are parallel to the weir 3 and to the low feed zone of the actual flotation unit 5. The plates extend over the entire width of the reactor. The plates 4a have their upper edge located above the level of the water, whilst their lower edge is at a distance from the floor so as to leave the liquid only a lower passage. The plates 4b extend down to the floor and stop below, at a distance from, the level of the water so as to only allow the liquid an upper passage. These plates restrict the flow to successively carry out descending and ascending movements in each of the cells 4c formed by the plates 4a and 4b.

The spaces between plates 4a and 4b and between the high plates 4a and the floor, are such that the hydraulic velocities are greater than the settling velocities of the heaviest particles and thus the wash-out velocities of the sludge formed by the flocks settled on the floors of each cell 4c. The self-cleaning thus limits deposits on the floors. The curved profile 4d, concave towards the top, of the floors of the cells further reduces the deposits and slightly promotes plug flow.

On leaving the plug-flow flocculator 4, in the bottom part, the velocities of approach of the flotation unit 5 are very low and perfectly homogenous. This is without doubt what explains the astonishing results obtained on the treatment of polluted waters. Indeed, as will be apparent in the examples given below (see example 3), the plug-flow flocculator makes it possible to treat loaded effluents whilst the results are greatly deteriorated when stirred flocculators (high local velocities and rotational movement) are used. It should be specified that with polluted waters (above all that are polluted with mineral materials) the floated sludges are very delicate and therefore sensitive to the turbulences which may make them fall.

In conclusion the baffle plug-flow static flocculator 4, fed homogeneously with homogeneous microflocks, allows a very compact flocculation and a flotation unit approach velocity that is consistent and very low.

The plug-flow static flocculator may have plates spaced further and further apart in order to reduce the flotation unit approach velocities.

The actual flotation unit 5 may be a conventional flotation unit with velocities of between 6 and 15 m/h in the flotation zone or a rapid flotation unit with velocities of 20 to 60 m/h. The qualities and the compactness of the coagulation/flocculation apparatus of the invention further increase the current competitiveness and attractiveness of rapid flotation units. Water is supplied to the flotation unit, from the flocculator 4, by a passage located in the bottom part and that extends over the entire width.

The clarified water exits at 6 (FIGS. 1 and 2), generally in the bottom part. The sludges, recovered at the surface of the flotation unit, are discharged at 7 (FIGS. 1 and 2).

Figure 3:
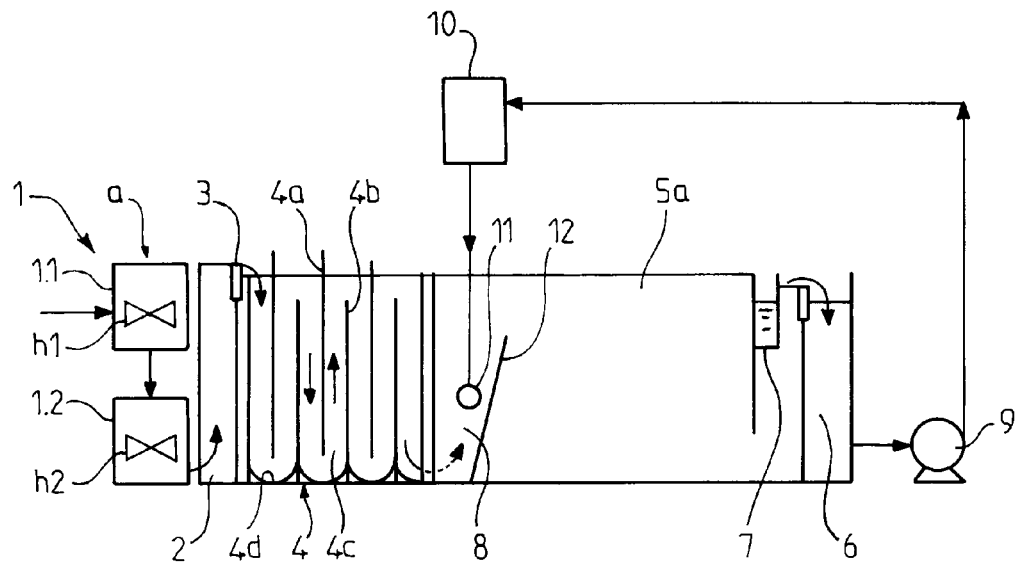
FIG. 3 is a vertical schematic cross section of a variant of the coagulation/flocculation apparatus, with a variant for the flotation unit.
Figure 4:
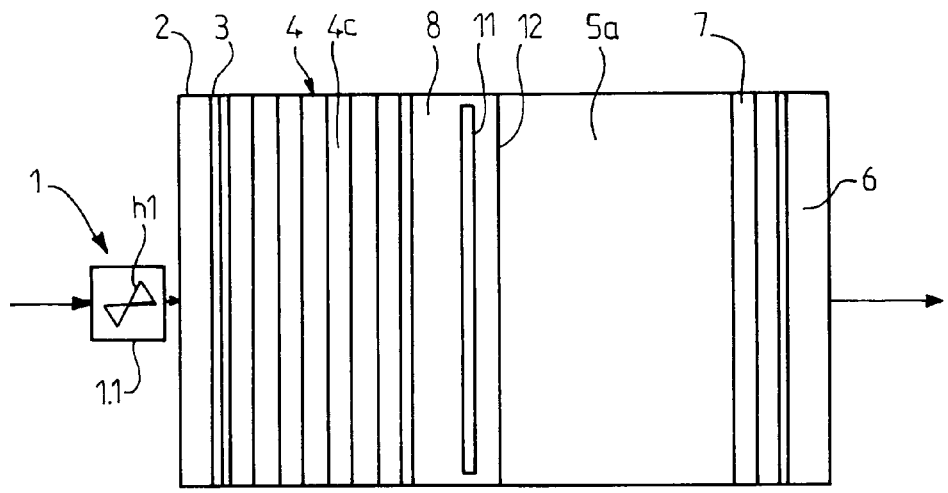
FIG. 4 is a schematic top view of the assembly from FIG. 3.

FIGS. 3 and 4 show an embodiment variant of the apparatus. The coagulant injection reactor consists of two reactors in series (1.1 and 1.2), each at high energy, with stirring impellers h1, h2. Advantageously, each coagulant injection reactor 1.1 and 1.2 is at an energy between 40 and 250 $W/m^3$.

The coagulation reactor 2 and the plug-flow flocculator 4 are similar to those from FIGS. 1 and 2. The flocculated raw water is conveyed through a feed passage in a low zone 8 of the flotation unit 5a. An upflow is created with microbubbles produced by a pressurization-expansion system comprising a pump 9 that recycles a fraction of the clarified water to a pressurization vessel 10. The pressurized water is injected and expanded by a nozzle 11 in the bottom part. The mixing zone 8 is separated from the actual flotation zone by an inclined weir 12 that starts from the floor, leaning towards downstream and that stops at a distance below the upper level of the water. The suspended matter entrained by the microbubbles accumulates at the surface and is discharged downstream by a transverse channel constituting the outlet 7 of the sludges. The clarified water is discharged from a downstream cell connected to the outlet 6 and to the pump suction inlet 9.

EXAMPLES

Several series of tests were carried out on various types of water (tertiary treatment of residual waters, treatment of seawater and treatment of polluted river water).

Depending on the case, the tests were carried out on one or two mini industrial units (or pilot units) placed in parallel.

The pilot units have a capacity of 24 $m^3/h$ and make it possible to carry out the steps of coagulation, flocculation and clarification by flotation (cross section of the flotation unit 0.8 $m^2$). These steps, or the components of the pilot unit, are adjustable and make it possible to change the treatment steps, to install different types of reactors and to vary the volumes of the reactors. The microbubbles are generated by a pressure-expansion system comprising a pressurization vessel at 5 bar connected to an expansion system that ensures the formation of microbubbles having a diameter of around 40 µm (40 micrometers). The recirculation ratio in the pressurization is around 10%.

First Series of Tests

A first series of tests was carried out on a residual water leaving a biological treatment in order to carry out a final phosphorus removal treatment (tertiary treatment). The objective is to test various flocculation reactors on a water having a relatively constant turbidity and where the kinetics for the removal of phosphorus are well controlled.

This water coagulates easily. The base version proved effective: the coagulant is injected by a high-energy in-line mixer, having an energy of at least 1000 W/m$^3$, the water to be treated then passes through the non-stirred reactor equipped at its outlet with a weir, then finally through the actual flocculation reactor followed by the same flotation unit.

The flocculation reactors tested with their residence time were:
a static reactor with deflectors, residence time 8 minutes, stirred reactor, residence time 8 minutes (2 tanks in series with impeller mixers),
static plug-flow reactor with baffles, residence times successively 3, 4.5 and 7.5 minutes.

The characteristics of the raw water are:
turbidity of the raw water RW=5 to 10 NTU
suspended matter in the raw water RW=7 to 15 g/m$^3$
total phosphorus raw water RW: between 0.5 and 7 g/m$^3$
throughput treated: 24 m$^3$/h
reactants: coagulant (FeCl$_3$) 50 g/m$^3$, polymer=0

Figure 5:
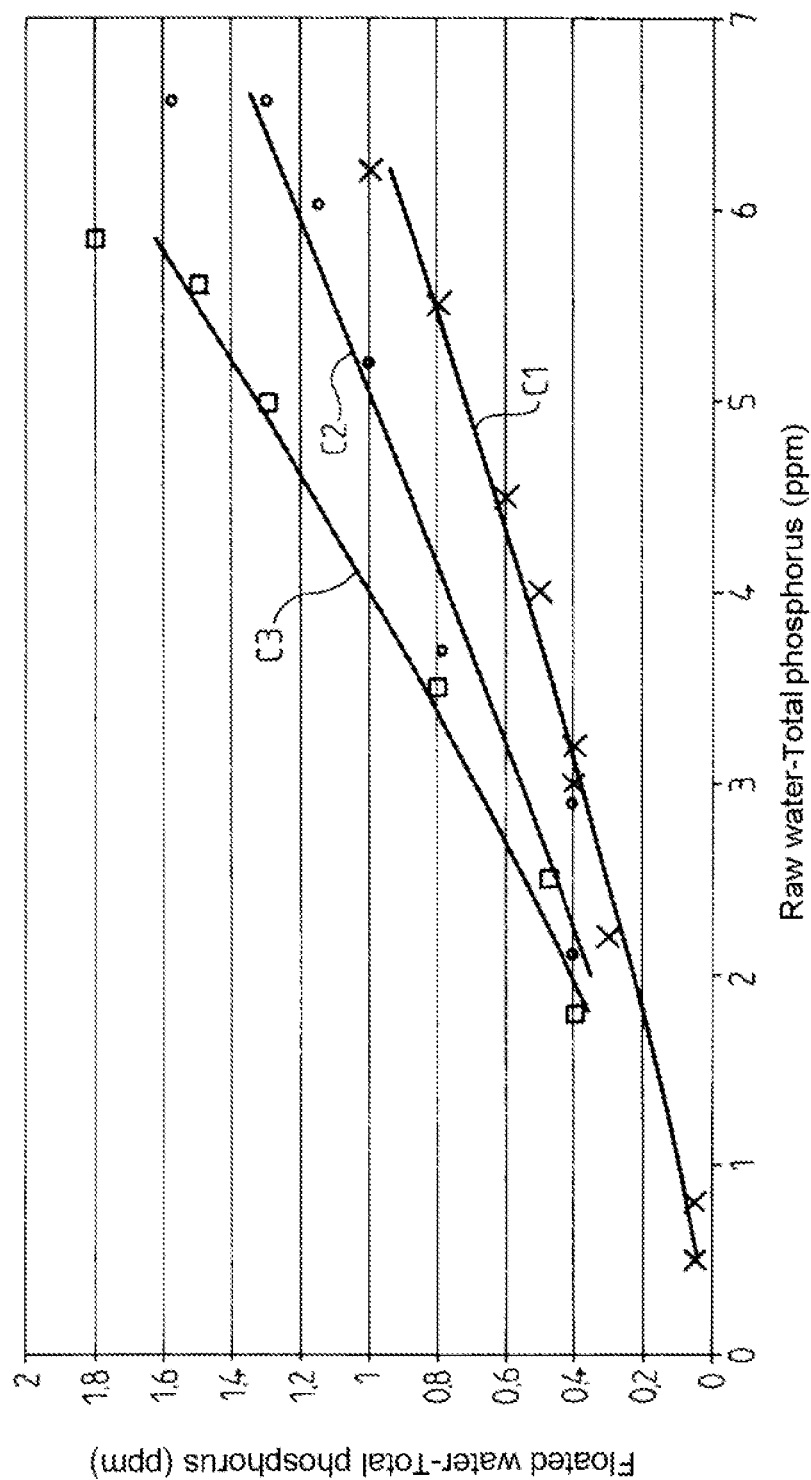
FIG. 5 is a graph comparing the performances of various flocculators for the removal of phosphorus.

The results were shown on the graph on FIG. 5. They express the phosphorus in the floated water (ppm or g/m$^3$) shown on the ordinate, as a function of the phosphorus of the raw water (ppm or g/m$^3$), shown on the abscissa, for the various types of reactors mentioned.

The best results, illustrated by the curve C1, are obtained with the static plug-flow flocculation reactor with baffles, according to the invention, whatever the residence time greater than 3 minutes.

The stirred flocculator (8 minutes) gives results that are quite close, illustrated by curve C2, but that are more dispersed for a longer residence time.

The other static reactor with deflectors, therefore that is not plug flow, gives worse results, illustrated by the curve C3 (in this type of reactor the short circuits are very significant). Furthermore, the bottom sludges appear very quickly due to the absence of bottom sweeping.

In conclusion, in this application the plug-flow flocculator is used. It is believed that this plug-flow flocculator reduces, or eliminates, the short circuits, which favors the phosphorus removal reactions.

Second Series of Tests

A second series of tests was carried out on seawater and with the same pilot unit.

Seawater is more difficult to coagulate. The coagulant is injected at the inlet of a coagulant injection reactor, with a residence time of 3 minutes, followed by a zone without stirring of less than 1 minute that forms the coagulation reactor, followed or not by a weir (10 cm fall of water) and by the flocculation reactor which is the one defined in the preceding example with a flocculation time of 6 minutes.

The characteristics of the raw water are:
turbidity of the raw water RW=1 to 15 NTU
throughput treated: 24 m$^3$/h
reactants: coagulant (FeCl$_3$) 10 g/m$^3$, polymer=0

The configuration is satisfactory, but the test which is of interest here is the impact or otherwise of the weir on the quality of the floated water wherein no polymer is injected into the weir.

The results are the following:

|  | Floated water (NTU) | |
| --- | --- | --- |
| Seawater (NTU) | without weir | with weir |
| 1.6 | 0.7 | 0.7 |
| 2 | 0.9 | 0.95 |
| 2.9 | 1.5 | 1.2 |
| 5 | 2. | 1.5 |
| 7.2 | 2.5 | 1.9 |
| 10 | 3.4 | 2.1 |
| 13.3 | 3.7 | 2.3 |

The test shows that the positive effect of the weir is marked and unexpectedly assumes the turbidity as the seawater increases, here beyond around 3 NTU.

Under difficult flocculation conditions, the weir 3 has a favorable effect on the clarification by flotation.

Third Series of Tests

A third series of tests was carried out on river water and on the same pilot unit. Applied to the treatment of surface waters (river or subterranean waters) the configuration has proved very efficient. The limitation of the applications of flotation with respect to settling stem from the fact that the flotation cannot normally treat waters for which the turbidities are greater than 30 NTU or even 50 NTU. The tests reported here have the objective of confirming the best flocculator for treating polluted waters (50 to 300 NTU). For these tests, the two pilot lines are placed parallel.

The two technologies compared were:
a stirred flocculation reactor: two flocculation reactors in series (two tanks in series with impeller stirrers) with 12 minutes of residence time,
a static plug-flow flocculation reactor with baffles having a residence time of 5 minutes.

For the two configurations, the coagulant is injected by an in-line mixer at the inlet of a coagulant injection reactor having a residence time of 3 minutes followed by a zone without stirring (constituting the coagulation reactor 2) of less than 1 minute, by a weir and by one of the two flocculation reactors. The flotation unit is still the same and the throughput applied to each of the two pilot lines is between 16 and 24 m$^3$/h.

The characteristics of the tests are the following:
turbidity of the raw water RW=10 to 250 NTU (temperature 5 to 7° C.)
throughput treated: 24 m$^3$/h and reduced to 16 m$^3$/h for turbidities of greater than 100 NTU
reactants: coagulant (FeCl$_3$) 30 to 40 g/m$^3$, polymer=0.2 to 0.4 g/m$^3$ depending on the turbidity of the raw water (less than or greater than 50 NTU).

|  | Floated water (NTU) | |
| --- | --- | --- |
| River water (NTU) | Stirred flocculator | Plug-flow flocculator |
| 12 | 1.6 | 1.55 |
| 28 | 5.3 | 3.5 |
| 42 | 8 | 5.3 |
| 45 | 7.5 | 5 |
| 61 | 15 | 6 |
| 73 | 25 | 6.3 |

-continued

| River water (NTU) | Floated water (NTU) | |
| --- | --- | --- |
| | Stirred flocculator | Plug-flow flocculator |
| 80 | 19 | 5.7 |
| 90 | 42 | 6.4 |
| 105 | 43 | 5.5 |
| 153 | 62 | 8.7 |
| 208 | 87 | 7.8 |
| 242 | 96 | 10.3 |

Up to 50 NTU, the 2 types of flocculator have quite similar performances. Beyond that, the turbidity of the floated water is around 2 to 10 times greater than that of the plug-flow flocculator. In conclusion, in order to treat high turbidities by flotation, the energy-free static plug-flow flocculator gives far superior results. In addition the static plug-flow flocculator is relatively less bulky, and it consumes less energy.

Other Applications

For more delicate treatments (seawater, etc.) or for polluted waters or for generally providing more flexibility and effectiveness, it is possible to carry out the coagulant injection step in two stirred reactors 1.1 and 1.2 in series (FIGS. 3 and 4). This makes it possible, for example, to shift the injection of polymer into the second reactor instead of injecting it into the weir 3. Furthermore, this configuration makes it possible to carry out the double injection of coagulant described in French patent No. 2 909 993 (06 10866 filed on Dec. 13, 2006). A first injection of coagulant into the coagulant injection reactor, the injection of polymer into the non-stirred coagulation reactor and the second injection of coagulant into the weir 3.

The coagulation/flocculation apparatus of the invention could be used in front of a filter or membranes where it is desired, as in front of a flotation unit, to filter flocks formed that are light and non-clogging (in particular without polymer).

The coagulation/flocculation apparatus of the invention could optionally be used before a settling tank, on condition that the flocculation times are adapted (longer), there is an objective to reduce the energy consumed and finally it is accepted to work on the settling tank at slower speeds (larger apparatus).

The invention claimed is:

1. A coagulation/flocculation apparatus for the treatment of a hydraulic flow of any type of liquid, upstream of a physical separation element or a filtration unit, which apparatus comprises at least one coagulator with injection of coagulant, followed by a flocculator, which are successively passed through by the hydraulic flow, wherein:

the coagulator comprises a high-energy coagulant injection reactor, followed by a low-energy coagulation reactor, an intermediate energy-inducing element is positioned between the coagulation reactor and the flocculator, and the flocculator is a static flocculator of plug-flow type.

2. The apparatus as claimed in claim 1, wherein the static flocculator of plug-flow type has the same width as the physical separation element located downstream.

3. The apparatus as claimed in claim 1, wherein the static flocculator of plug-flow type is a baffle flocculator.

4. The apparatus as claimed in claim 1, wherein the high-energy coagulant injection reactor is separated from the coagulation reactor.

5. The apparatus as claimed in claim 1, wherein the coagulant injection reactor is at an energy between 40 and 10 000 $W/m^3$.

6. The apparatus as claimed in claim 5, wherein the coagulant injection reactor is an in-line mixer with an energy per unit volume of between 200 and 10 000 $W/m^3$.

7. The apparatus as claimed in claim 5, wherein the coagulant injection reactor comprises at least one stirred tank reactor having an energy per unit volume of between 40 and 250 $W/m^3$.

8. The apparatus as claimed in claim 7, wherein the coagulant injection reactor comprises two stirred tank reactors in series having an energy per unit volume of between 40 and 250 $W/m^3$.

9. The apparatus as claimed in claim 1, wherein the coagulation reactor has an energy per unit volume of less than 10 $W/m^3$.

10. The apparatus as claimed in claim 1, wherein the intermediate energy-inducing element induces an energy per unit volume of greater than 20 $W/m^3$ in the upper zone of the plug-flow flocculator.

11. The apparatus as claimed in claim 1, wherein the intermediate energy-inducing element comprises a weir having a fall head of at least 5 cm.

12. The apparatus as claimed in claim 11, wherein the weir has a fall head of less than or equal to 25 cm.

13. The apparatus as claimed in claim 1, wherein the plug-flow flocculator is at an energy per unit volume of less than 1 $W/m^3$, preferably less than 0.3 $W/m^3$.

14. A process for implementing a coagulation/flocculation apparatus as claimed in claim 1, for the treatment of a hydraulic flow of any type of liquid, wherein the residence time in the low-energy coagulation reactor is less than 1 minute.

15. The process as claimed in claim 14, wherein the residence time in the plug-flow type flocculation reactor is between 2 and 8 minutes.

16. A process for implementing a coagulation/flocculation apparatus as claimed in claim 6, wherein the residence time in the coagulant injection reactor, in the case of a stirred tank reactor, is between 2 and 6 minutes, depending on the type of water to be treated.

17. The apparatus as claimed in claim 10, wherein the intermediate energy-inducing element induces an energy per unit volume of between 20 and 100 $W/m^3$ in the upper zone of the plug-flow flocculator.

* * * * *